United States Patent [19]
Yahata et al.

[11] Patent Number: 5,821,325
[45] Date of Patent: Oct. 13, 1998

[54] POLYCARBODIIMIDE DERIVATIVES AND METHOD FOR PREPARING THE SAME

[75] Inventors: Ken Yahata; Yasuyuki Takiguchi; Hiroshi Miyoshi; Yasuyoshi Komoto; Akira Hayashida, all of Kawasaki, Japan

[73] Assignee: Shin-Estu Chemical Co., Ltd., Tokyo, Japan

[21] Appl. No.: 763,982

[22] Filed: Dec. 10, 1996

[30] Foreign Application Priority Data

Dec. 12, 1995 [JP] Japan ..................... 7-322704

[51] Int. Cl.⁶ ................ C08G 73/10; C08G 63/06; C08G 75/04
[52] U.S. Cl. .............. 528/310; 528/170; 528/322; 528/353; 528/361; 528/373; 528/374; 528/375
[58] Field of Search ..................... 528/361, 373, 528/374, 375, 353, 322, 170, 310

[56] References Cited

U.S. PATENT DOCUMENTS

| | | | |
|---|---|---|---|
| 2,941,966 | 6/1960 | Campbell | 528/310 |
| 3,947,274 | 3/1976 | Mikawa et al. | 528/310 |

FOREIGN PATENT DOCUMENTS

| | | |
|---|---|---|
| 0443524 | 8/1991 | European Pat. Off. . |
| 2579600 | 10/1991 | France . |
| 2 423 482 | 12/1974 | Germany . |
| 61-235414 | 10/1986 | Japan . |
| 61-268714 | 11/1986 | Japan . |
| 2-292316 | 12/1990 | Japan . |
| 3-247504 | 11/1991 | Japan . |
| 3-2475052 | 11/1991 | Japan . |
| 4-279618 | 10/1992 | Japan . |
| 7140144 | 12/1996 | Japan . |
| 7140145 | 12/1996 | Japan . |

OTHER PUBLICATIONS

J Org. Chem. 28, 2069 (Aug. 1963) Carbodiimides, IV., Smeltz et al.

J. Chem. Soc. (c) (1968) p. 1480, The month of publication is not available.

J. Chem. Chem. 34, (Nov. 1969) p. 3707.

An Quim., 67, (1971) p. 901 The month of publication is not available.

Archiv der Pharmazie, (1972) 305 p. 654 (Weinheim) The month of publication is not available.

Angewandte Chemie International Edition, vol. 20, No. 10, Oct. 1981, pp. 819–830, Kuno Wagner, et al.—α.ω—Diisocyanatocarbodiimides, –Polycarbodiimides, and their Derivatives.

*Primary Examiner*—P. Hampton-Hightower
*Attorney, Agent, or Firm*—McAulay Nissen Goldberg Kiel & Hand, LLP

[57] ABSTRACT

A hydroxy- or mercapto-bearing organic compound is caused to react with a polycarbodiimide compound in the presence of an alcoholate of an alkali metal or of an alkaline earth metal. The carbodiimide linkage in the polymer which results from the above-described reaction is crosslinked.

10 Claims, 7 Drawing Sheets

POLYCARBODIIMIDE DERIVATIVES AND METHOD FOR PREPARING THE SAME

BACKGROUND OF THE INVENTION

1. Field of the Invention

The present invention relates to a polycarbodiimide derivative which is obtained by chemically adding a hydroxy -or mercapto-bearing compound to a polymeric compound having a carbodiimide linkage as a reactive functional group and to a method for preparing such a derivative.

2. Description of the Invention

A low molecular weight carbodiimide, such as dicyclohexylcarbodiimide, diisopropylcarbodiimide, di-p-tolylcarbodiimide or the like, is a highly reactive reagent commonly used for a dehydrating condensation. These low molecular weight carbodiimides are used in such fields as ester synthesis and peptide synthesis.

Meanwhile, a polycarbodiimide having a plurality of carbodiimide linkages in a molecule is generally prepared by a decarboxylating condensation of a diisocyanate in the presence of a carbodiimidization catalyst in an appropriate solvent. Such a polycarbodiimide whidh derives from an aromatic diisocyanate in particular is known to be useful as a heat resisting polymer (J. Org. Chem., 28, 2069(1963) and U.S. Pat. No. 2,941,966). Such a carbodiimide linkage is known to react with a hydroxy-bearing compound, such as an alcohol, to produce an isourea-type adduct.

As disclosed by Japanese Patent Provisional Publication Nos. 3-247,504 and 3-247,505, a polycarbodiimide undergoes a thermal crosslinking reaction to finally provide a glassy carbon. Japanese Patent Provisional Publication Nos. 61-235,414 and 61-268,714 disclose a method whereby a polycarbodiimide is crosslinked through a trimerization of carbodiimide linkage of polycarbodiimide.

Despite the high reactivity of the carbodiimide linkage, however, it has been reported that a reaction between the carbodiimide linkage and a hydroxy-bearing compound, such as an alcohol, to produce an isourea-type adduct requires excessive quantities of reagents and reaction conditions including a high temperature and a long reaction time (J. Org. Chem., 34, 3707(1969) ). Besides, this reaction is difficult to control, because the yield of reaction is low and the completion of the reaction is difficult. The present inventors have found that a polycarbodiimide in particular exhibits a considerably lower reactivity than a low molecular weight carbodiimide. That is, a polycarbodiimide in a solid state is very stable and entirely non-reactive to the above-mentioned reagents. In addition, even if a polycarbodiimide is dissolved in a solvent, it hardly reacts with the above-mentioned reagents even under a rigorous condition. Accordingly, a method whereby a hydroxy- or mercapto-bearing compound is chemically added to a high molecular weight polycarbodiimide is not known.

On the other hand, it has been reported that to the reaction between a carbodiimide and an alcohol a catalyst is effective which is exemplified by a trialkyllead alkoxide (J. Chem. Soc. (C), 1480 (1968)), fluoroboric acid (Arch. Pharm. (Weinheim), 305, 654 (1972)) and zinc chloride (German Patent No. 2,423,482). However, since these catalysts contain a heavy metal or are strongly acidic, they entail such problems as environmental pollution in a post-treatment stage or the necessity of strict caution in handling.

Although the use of sodium alkoxide has been reported for a reaction with a low molecular weight carbodiimide (An. Quim., 67, 901 (1971)), no report has been made as to the use of sodium alkoxide for a reaction with a high molecular weight polycarbodiimide.

And, as stated above, although a thermal crosslinking reaction of a polycarbodiimide is made known by Japanese Patent Provisional Publication Nos. 3-247,504 and 3-247,505, nothing is known about a crosslinking reaction of a polycarbodiimide partially modified with a hydroxy or mercapto group.

SUMMARY OF THE INVENTION

One object of the present invention is to carry out a rapid reaction between a polymeric compound having a carbodiimide linkage and a hydroxy- or mercapto-bearing compound to thereby obtain an adduct, which is hardly obtainable by an ordinary method.

Another object of the present invention is to provide a novel material by crosslinking a carbodiimide linkage remaining in the above-mentioned adduct.

The present inventors have conducted studies in order to find a method whereby a polycarbodiimide, which is more stable and has a higher molecular weight, can also react, and, as a result, they have found that the presence of a catalytic amount of an alcoholate of an alkali metal or of an alkaline earth metal is effective to an addition reaction between a polycarbodiimide and a hydroxy-bearing compound and that the alcoholate is also effective to an addition reaction between a polycarbodiimide and a mercapto-bearing compound. Particularly, they have found that a high molecular weight polycarbodiimide, which has a lower reactivity than a low molecular weight carbodiimide and which has a molecular weight of not less than 5,000, reacts in the above-described process utilizing the alcoholate in a short period of time and quantitatively at room temperature.

Accordingly, an alkoxy, siloxy or thioalkoxy group in any proportion based on the amount of a polycarbodiimide can be introduced into a molecule of the polycarbodiimide by merely adding a hydroxy- or mercapto-bearing compound in any proportion based on the amount of a polycarbodiimide to a reaction system of the polycarbodiimide and causing the reaction mixture to react, and, as a result, it has become easier to control the introduced amount of any of the above-mentioned groups.

In order to achieve the aforementioned objects, the present inventors have developed a method for preparing a polymer shown in (1) or (2) and having an isourea linkage or isothiourea linkage by a reaction between a hydroxy- or mercapto-bearing organic compound and a polycarbodiimide wherein the hydroxy- or mercapto-bearing organic compound and the polycarbodiimide are caused to react in the presence of an alcoholate of an alkali metal or of an alkaline earth metal.

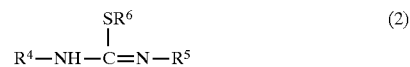

wherein $R^1$, $R^2$, $R^3$, $R^4$, $R^5$ and $R^6$ represent an organic group having a carbon and/or silicon atom.

Further, the present inventors have developed a method for preparing a polymer having an isourea linkage or isothiourea linkage and a carbodiimide linkage by a reaction between a hydroxy- or mercapto-bearing organic compound and a polycarbodiimide wherein the hydroxy- or mercapto-bearing compound and the polycarbodiimide are caused to react in the presence of an alcoholate of an alkali metal or of an alkaline earth metal.

In addition, the present inventors have developed a method for preparing a crosslinked polymer starting from the above-mentioned polymer having an isourea linkage or isothiourea linkage and a carbodiimide wherein the carbodiimide linkage of the foregoing polymer is crosslinked.

$R^1$, $R^2$, $R^4$ and $R^5$ in the above formulas (1) and (2) generally represent an organic group having a carbon and/or silicon atom, and are not limited to any specific chemical structures. They may include, for example, at least one element selected from nitrogen, oxygen, hydrogen, sulfur, phosphorus and halogen atom as well as carbon and silicon atom. They are chain groups which can include at least one isourea and/or isotiourea linkage, whose carbon number may vary in a wide range from that of lower alkyls to that of an organic compound with a molecular weight of more than 5,000. $R^3$ and $R^6$ are derived from hydroxy- or mercapto-bearing organic compounds and are not limited to any specific chemical structures. They may include, for example, at least one element selected from nitrogen, oxygen, silicon, sulfur, phosphorus and halogen atom as well as carbon and hydrogen atom. They are preferably $C_1$–$C_{10}$ aliphatic groups or aromatic groups having one or two aromatic rings.

In order to crosslink a carbodiimide linkage, a substance having a carbodiimide linkage may be thermally treated or a substance having a carbodiimide linkage may be admixed with a basic substance which promotes the trimerization of the carbodiimide linkage.

According to the present invention, it is possible to carry out a quick reaction between a hydroxy- or mercapto-bearing compound and a polymeric compound having a carbodiimide linkage and to easily obtain a crosslinked polymer which is difficult to obtain by an ordinary method.

The quantitative reactivity according to the present invention is useful as a method for producing a polyisourea or polyisothiourea. In addition, since the ratio between an isourea or isothiourea linkage and a carbodiimide linkage in a polyisourea or polyisothiourea can be controlled at will according to the method of the present invention by merely regulating the amount to be added of a hydroxy- or mercapto-bearing compound, it is easy to obtain a polymer which has an isourea or isothiourea linkage and a carbodiimide linkage.

In addition, since the reactivity between a carbodiimide linkage and a hydroxy- or mercapto-bearing compound enables a variety of functional groups to be easily introduced into a polymer, this reactivity can also be widely used in the field of manufacture of highly functional materials.

Besides, novel functional materials excellent in such properties as mechanical strength and heat resistance can be obtained by crosslinking the carbodiimide linkage still remaining in the aforementioned adduct.

Figure 1:
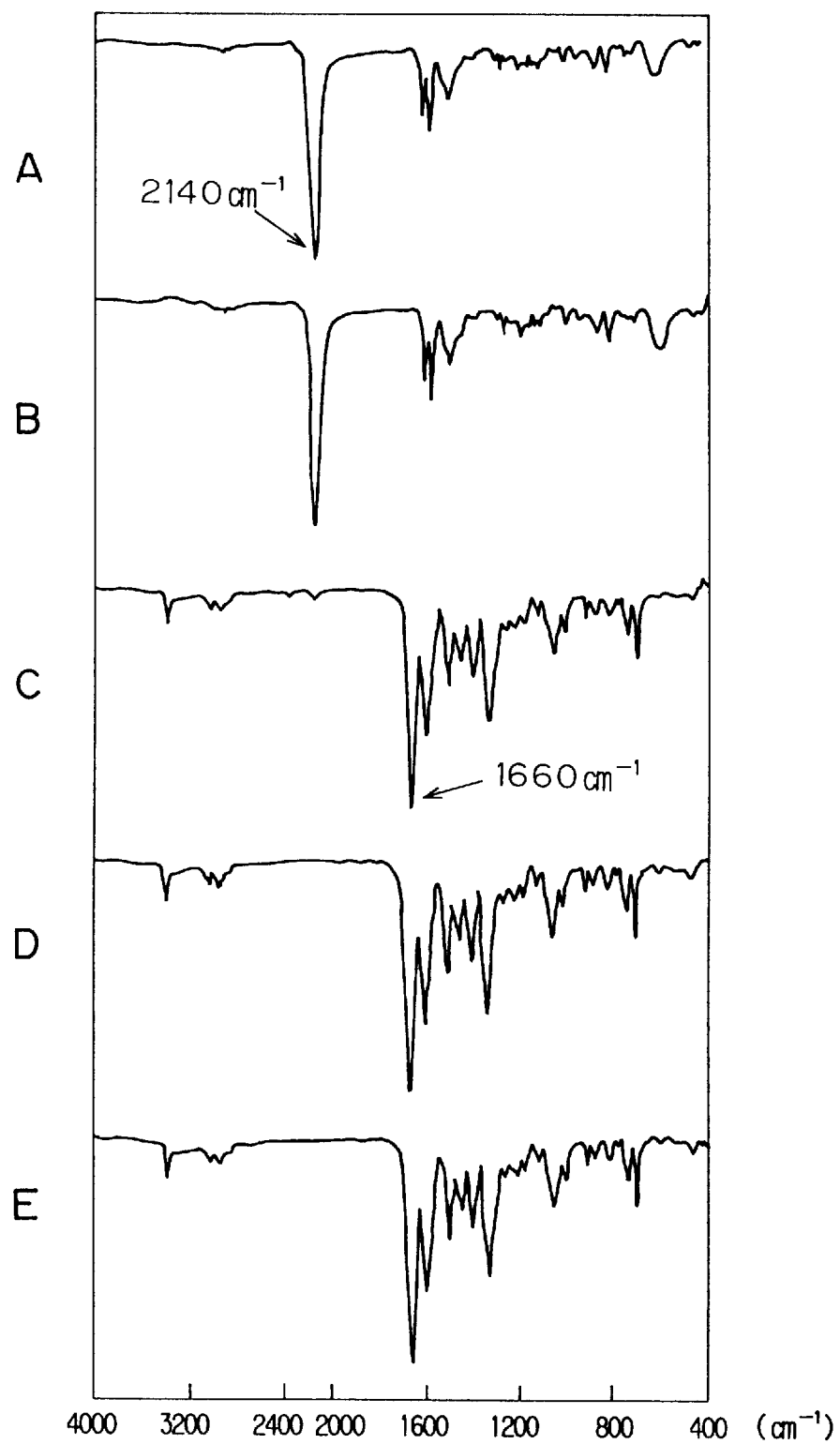
FIG. 1 shows IR spectra of a polycarbodiimide before and after effecting a reaction wherein the polycarbodiimide reacts, calculated with respect to the amount of carbodiimide linkage of the polycarbodiimide, with an equal molar amount of benzyl alcohol in the presence of sodium methoxide as a catalyst.

DETAILED DESCRIPTION OF PREFERRED EMBODIMENTS (Preparation of polycarbodiimide)

Polycarbodiimide is usually prepared by a method which consists in the decarboxylation of an organic diisocyanate in a hydrocarbon solvent such as toluene, xylene or decahydronaphthalene under heating. This method, however, generally provides an insoluble crosslinked product and therefore is not preferable to a subsequent addition reaction with a hydroxy- or mercapto-bearing compound. Therefore, a method, whereby a molecular weight is adjusted by controlling conditions including reaction temperature and reaction time as disclosed in Japanese Patent Application No. 7-140, 144 by the present inventors, is preferred. According to the method for preparing a polycarbodiimide described in Japanese Patent Application No. 7-140,144, an organic diisocyanate, the concentration of which is set to 1–20 w/v % based on the amount of a solvent, is admixed, calculated with respect to the amount of the organic diisocyanate, with 0.05–0.20 mole percent of a catalyst such as 3-methyl-1-phenyl-3-phospholene-1-oxide. Then, a polycarbodiimide, which has such a molecular weight that enables the polycarbodiimide to be exist in a state of a solution, can be obtained by selecting a suitable reaction time of the foregoing reaction mixture from a range of 2 to 4 hours at 100°–120° C.

Besides, a polycarbodiimide obtained by use of a halogenated aliphatic hydrocarbon solvent such as tetrachloroethylene or an alicyclic ether solvent such as tetrahydrofuran according to the methods disclosed in Japanese Patent Provisional Publication Nos. 2-292,316 and 4-279,618 is desirable as a starting material to be used in the method of the present invention, because the polycarbodiimide is obtained as a stable solution. By the same reason, desirable as a starting material for use herein are a polycarbodiimide obtained by use of a halogenated aromatic hydrocarbon solvent as disclosed in Japanese Patent Application No.

7-140,145 by the present inventors and a polycarbodiimide obtained by use of an aromatic carboxylate solvent as disclosed in Japanese Patent Application No. 7-208,689 by the present inventors, wherein 1–20 w/w % of an organic diisocyanate is admixed, calculated with respect to the amount of the organic diisocyanate, with 0.05–0.20 mole percent of a catalyst and is heated to maintain the reaction mixture at a temperature in the range of 100°–150° C. for about 1 to 4 hours.

Examples of organic diisocyanates which are used as a starting material for the polycarbodiimide include hexamethylene diisocyanate, phenylene diisocyanate, tolylene diisocyanate, methylenebis(4-phenylisocyanate) and naphthylene diisocyanate. Particularly preferred are tolylene diisocyanate and methylenebis(4-phenylisocyanate).

The present invention is not limited to any abovementioned method for preparing polycarbodiimide but can be applied to any compound which is in a state of solution and has a plurality of carbodiimide linkages obtained by other methods. Generally, a usable polycarbodiimide is a compound having two or more, preferably five or more, carbodiimide linkages in a molecule thereof. Such a polycarbodiimide has a molecular weight preferably larger than 5,000 in order to provide general properties as a polymer.

(Addition of a hydroxy- or mercapto-bearing compound to a polycarbodiimide)

In the case where a hydroxy- or mercapto-bearing compound is added to a polycarbodiimide, firstly the polycarbodiimide is dissolved in a suitable solvent and then the solution is admixed with the foregoing compound along with an alcoholate of an alkali metal or of an alkaline earth metal. The solvent may be the same as the one used preparation of polycarbodiimide. In a reaction system, where an alcmeolate of an alkali metal or of an alkaline earth metal is not used, the reaction hardly proceeds even if the system is held at a high temperature. However, in a reaction system, where an alcoholate of an alkali metal or of an alkaline earth metal is present, the reaction occurs at room temperature or at a temperature in its neighborhood and the hydroxy- or mercapto-bearing compound reacts almost quantitatively. In order to further increase the reaction rate, it is effective to heat the system to a higher temperature but not above the boiling point of the solvent.

Examples of alcoholates of an alkali metal or of an alkaline earth metal to be used in the present invention include potassium methoxide, potassium ethoxide, sodium methoxide, sodium ethoxide, calcium dimethoxide and magnesium dimethoxide, whose carbon number may vary in a range from $C_1$ to $C_5$. Particularly preferred are sodium methoxide and sodium ethoxide. The added amount of the alcoholate of an alkali metal or of an alkaline earth metal is infinitesimal and ranges from 0.1 to 20 mole percent, preferably from 0.5 to 10 mole percent, based on the carbodiimide linkage.

Examples of hydroxy- or mercapto-bearing compounds include alcohols, silanols and thiols. Exemplary of alcohols are methanol, ethanol, propanol, octanol and benzyl alcohol. Exemplary of silanols are trimethylsilanol, triethylsilanol and diphenylmethylsilanol. Exemplary of thiols are ethanethiol and thiobenzyl alcohol. They may include, for example, at least one element selected from nitrogen, oxygen, silicon, sulfur, phosphorus and halogen atom as well as carbon and hydrogen atom. They are preferably $C_1$–$C_{10}$ aliphatic compound or aromatic compound having one or two aromatic rings. The added amount of alcohols, silanols and thiols preferably ranges from 1 to 100 mole percent based on the carbodiimide linkage. Excess amount of alcohols, silanols and thiols may be added to the solvent for the complete reaction.

In the addition reaction of a hydroxy- or mercapto-bearing compound to a polycarbodiimide, the addition of the compound to all of the carbodiimide linkages can be effected. In this case, the addition reaction is useful as a method for preparing a polyisourea or polyisothiourea which is difficult to synthesize by an ordinary method.

The ratio between the isourea or isothiourea and the polycarbodiimide can be easily set to any value by controlling the amount to be added of a hydroxy- or mercapto-bearing compound. Accordingly, the carbodiimide linkage, which has been left unconsumed in the above-described reaction, may be used to a variety of reactions. Besides, it can be easily carried out to introduce into a polycarbodiimide a compound having different hydroxy groups or mercapto groups, and it is also possible to prepare a polymer comprising three types of linkages, viz., isourea, isothiourea and carbodiimide linkages.

Besides, the carbodiimide linkage remaining in the aforementioned adduct may be crosslinked by a thermal treatment or by a trimerization treatment to provide polymeric materials having enhanced mechanical strength and heat resistance.

(Formation of a crosslinked polymer by heating)

The heating of a polymer having a carbodiimide linkage may be effected at a temperature in the range of 50° to 300° C. and preferably in the range of 100° to 260° C. If the reaction is performed at lower than 50° C., crosslinkage does not proceeded to the fullest extent. If the reaction is performed at higher than 300° C., the elimination reaction of organic groups proceeds and the resulting polymer lowers the strength. The heating is preferably conducted in vacuum or in a non-oxidizing atmosphere such as in nitrogen or in argon. However, the heating may be effected in air, if the temperature does not exceed 300° C.

(Formation of a crosslinked polymer by the addition of a basic substance)

The catalytic crosslinking of the carbodiimide linkage can also be effected by a trimerization reaction through the addition of a basic substance such as 1,5-diazabicyclo[4.3.0]nonen, 1,4-diazabicyclo[2.2.2]octane or 1,8-diazabicyclo[5.4.0]undecene. The added amount of the basic substance may be that amount which brings about a crosslinking rate acceptable to the molding operation and it ranges from 0.1 to 10 mole percent based on the carbodiimide linkage. The reaction temperature may be room temperature (–10° C. to 30° C. ), but it will be more effective to heat the reaction system to a temperature not exceeding 200° C. and preferably to a temperature not exceeding 100° C. for the completion of the reaction in a shorter period of time. The heating is preferably in time for 1–60 min.

As a result of the crosslinking of the carbodiimine linkage, it is possible to obtain polymeric materials which have enhanced mechanical strength and heat resistance and which hold a high functionality owing to the addition thereto of a hydroxy- or mercapto-bearing compound.

EXAMPLE

The present invention will be further clarified by the following examples, which should not be viewed as a limitation on any embodiment of the invention.

(Synthesis Example 1 of polycarbodiimide)
(Synthesis of polycarbodiimde from 2,4-tolylene diisocyanate)

Commercially available following ingredients, i.e., 5.40 g of 2,4-tolylene diisocyanate, 12.0 mg of 3-methyl-1-phenyl- 3-phospholene-1-oxide and 50 ml of tetrachloroethylene as a solvent for reaction, were heated to be refluxed for 4 hours with stirring under an atmosphere of nitrogen to obtain a polycarbodiimide solution.

(Synthesis Example 2 of polycarbodiimide)
(Synthesis of polycarbodiimde from methylenebis(4-phenylisocyanate))

Commercially available following ingredients, i.e., 7.75 g of methylenebis(4-phenylisocyanate), 12.0 mg of 3-methyl-1-phenyl-3-phospholene-1-oxide and 50 ml of chlorobenzene as a solvent for reaction, were heated and maintained at 120° C. for 1 hour with stirring under an atmosphere in nitrogen to obtain a polycarbodiimide solution.

Example 1
(Reaction between a polycarbodiimide and benzyl alcohol catalyzed by sodium methoxide)

Five ml of tetrachloroethylene comprising 0.41 g of polycarbodiimide (containing 3.1 mmol of carbodiimide linkage) which was obtained according to Synthesis Example 1 was admixed with 0.34 g of benzyl alcohol (an equal molar amount based on carbodiimide linkage).

The above solution was heated and maintained at 80° C. for one hour. Infrared absorption spectra (hereinafter abbreviated as IR spectra) before reaction and after maintaining at 80° C. are indicated in FIGS. 1A and 1B, respectively. Since no change is observed in IR spectra before and after reaction, it is clarified that no reaction occurs in the above-described condition.

The above solution was admixed with 10 mg of 28% sodium methoxide/methanol solution (1.7 mole percent based on carbodiimide linkage) as a catalyst, and stirred at room temperature. Changes in IR spectra with time are indicated in FIGS. 1C, 1D and 1E respectively. FIG. 1C, which shows the reaction product immediately after the addition of the catalyst, indicates a considerable attenuation of absorption at $2140$ cm$^{-1}$ assignable to carbodiimide linkage and the emergence of the absorption band at 1660 cm$^{-1}$ assignable to isourea linkage. FIGS. 1D and 1E, which show the reaction products 10 minutes and 30 minutes after the addition of the catalyst, respectively, indicate that the absorption of carbodiimide linkage has completely disappeared. As a result, it has been evidenced that the method according to the present invention is effective to the reaction between a polycarbodiimide and a hydroxy-bearing compound, because the added benzyl alcohol is found to have reacted instantly and completely even at room temperature.

Example 2
(Reaction between a polycarbodiimide and octanol catalyzed by sodium methoxide)

Figure 2:
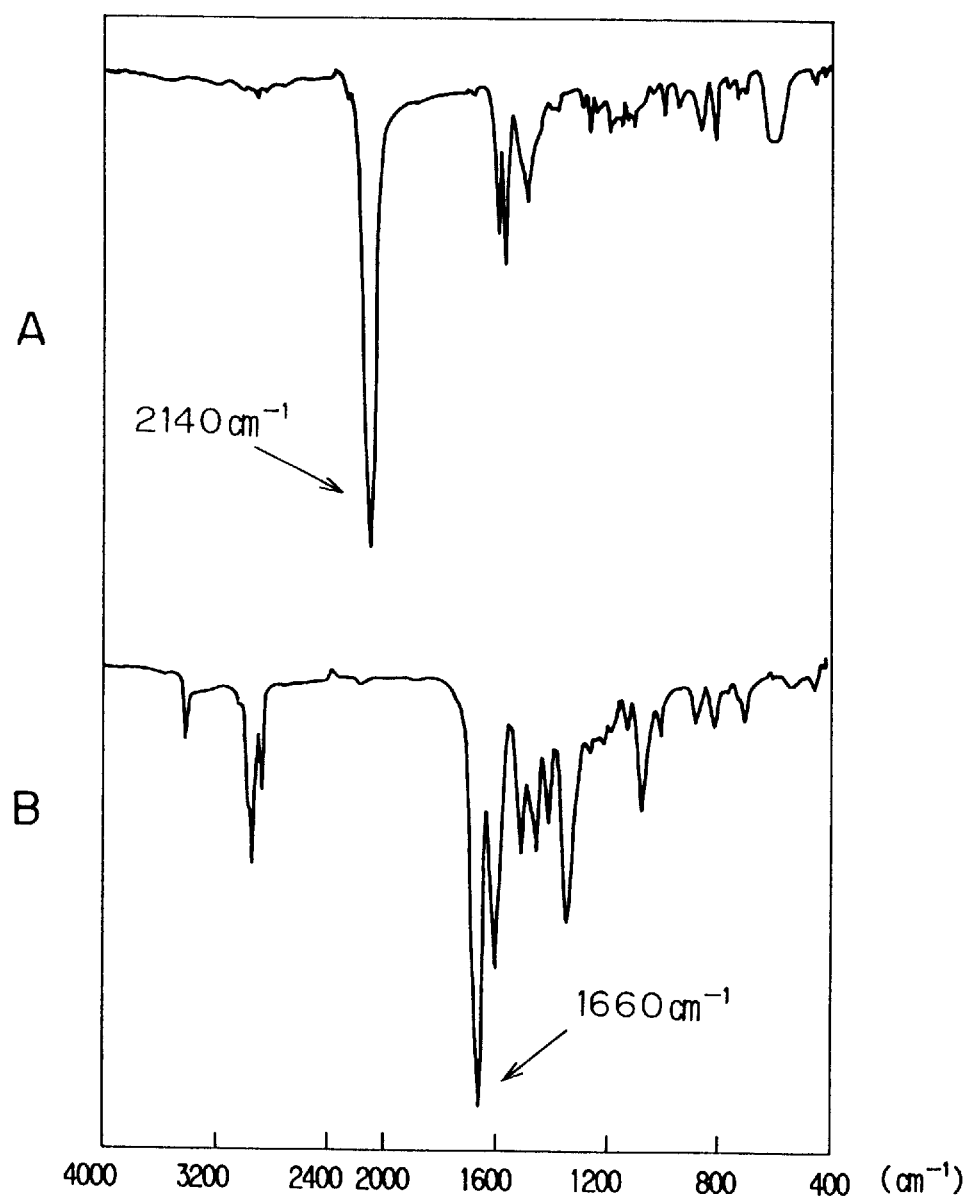
FIG. 2 shows IR spectra of a polycarbodiimide before and after effecting a reaction wherein the polycarbodiimide reacts, calculated with respect to the amount of carbodiimide linkage of the polycarbodiimide, with an equal molar amount of octanol in the presence of sodium methoxide as a catalyst.

Five ml of tetrachloroethylene comprising 0.41 g of polycarbodiimide (containing 3.1 mmol of carbodiimide linkage) which was obtained according to Synthesis Example 1 was admixed with 0.41 g of octanol (equal molar amount based on carbodiimide linkage) and further with 10 mg of 28% sodium methoxide/methanol solution (1.7 mole percent based on carbodiimide linkage) as a catalyst, and the resultant solution was stirred at room temperature for one hour. IR spectra before and after reaction are indicated in FIGS. 2A and 2B, respectively. After the reaction, the absorption at 2140 cm$^{-1}$ assignable to carbodiimide disappears and the absorption band at 1660 cm$^{-1}$ assignable to isourea linkage emerges. As a result, it has been evidenced that the present invention is effective to the reaction between a polycarbodiimide and a hydroxy-bearing compound, because the added octanol is found to have reacted almost completely.

Example 3
(Reaction between a polycarbodiimide and octanol catalyzed by sodium ethoxide)

Figure 3:
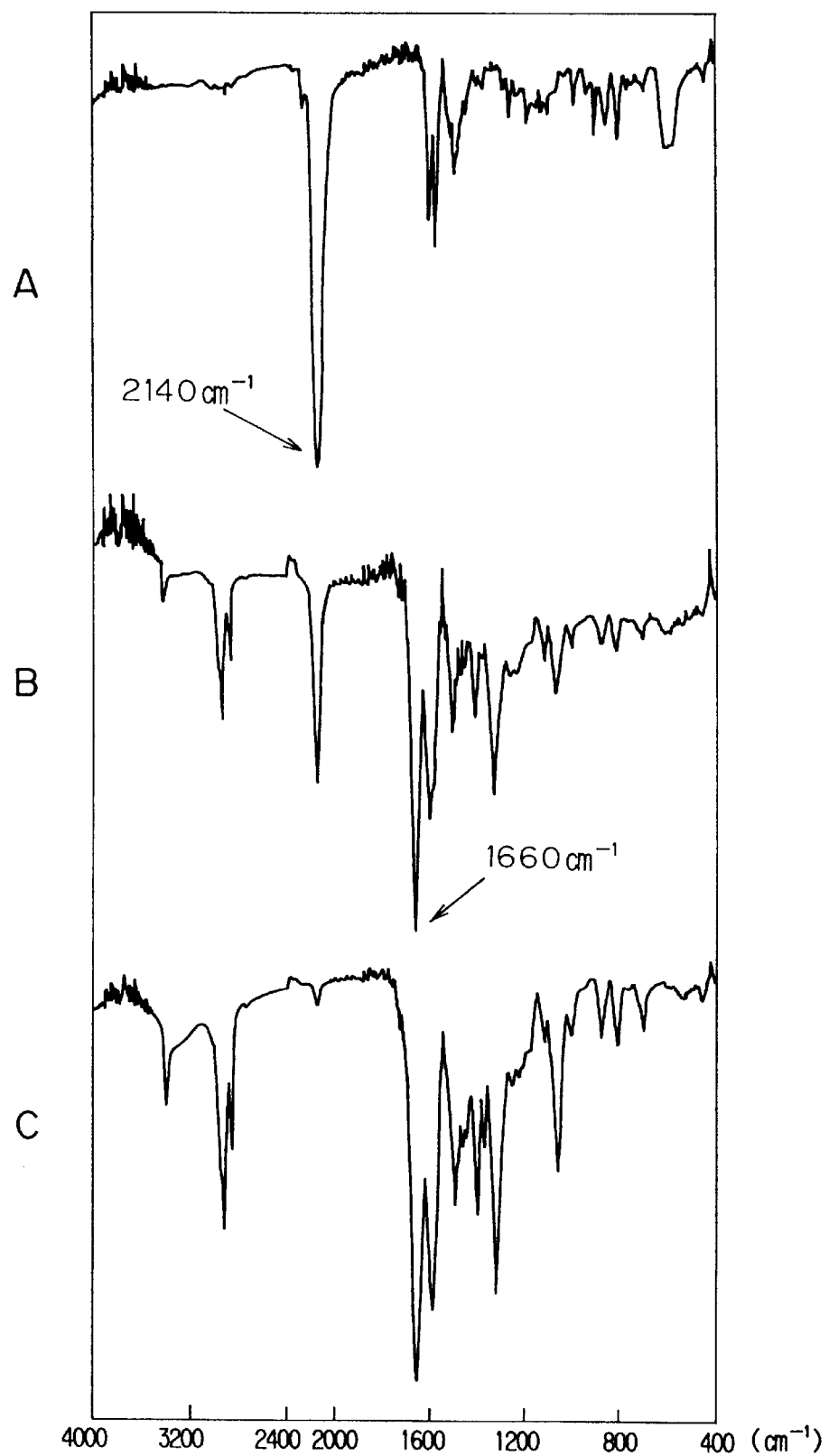
FIG. 3 shows IR spectra of a polycarbodiimide before and after effecting a reaction wherein the polycarbodiimide reacts, calculated with respect to the amount of carbodiimide linkage of the polycarbodiimide, with an equal molar amount of octanol in the presence of sodium ethoxide as a catalyst.

Five ml of tetrachloroethylene comprising 0.41 g of polycarbodiimide (containing 3.1 mmol of carbodiimide linkage) which was obtained according to Synthesis Example 1 was admixed with 0.41 g of octanol (equal molar amount based on carbodiimide linkage) and further with 30 mg of 15% sodium ethoxide/ethanol solution (2.1 mole percent based on carbodiimide linkage) as a catalyst, and the resultant solution was stirred for 30 minutes at room temperature. IR spectra before and after reaction are indicated in FIG. 3. FIG. 3A shows the state before the addition of the catalyst, FIG. 3B shows the state immediately after the addition of the catalyst and FIG. C shows the state 30 minutes after the addition of the catalyst. After the addition of the sodium ethoxide solution, the absorption at 2140 cm$^{-1}$ assignable to carbodiimide linkage almost disappears and the absorption band at 1660 cm$^{-1}$ assignable to isourea emerges. As a result, it has been evidenced that the method according to the present invention is effective to the reaction between a polycarbodiimide and a hydroxy-bearing compound, because the added octanol is found to have reacted almost completely.

Example 4
(Synthesis of a polymer having isourea and carbodiimide linkages)

Ten ml of-tetrachloroethylene comprising 0.81 g of poly-carbodiimide (containing 6.2 mmol of carbodiimide linkage) which was obtained according to Synthesis Example 1 was admixed with 0.42 g of octanol (3.2 mmol and 51.6 mole percent based on carbodiimide linkage).

Figure 4:
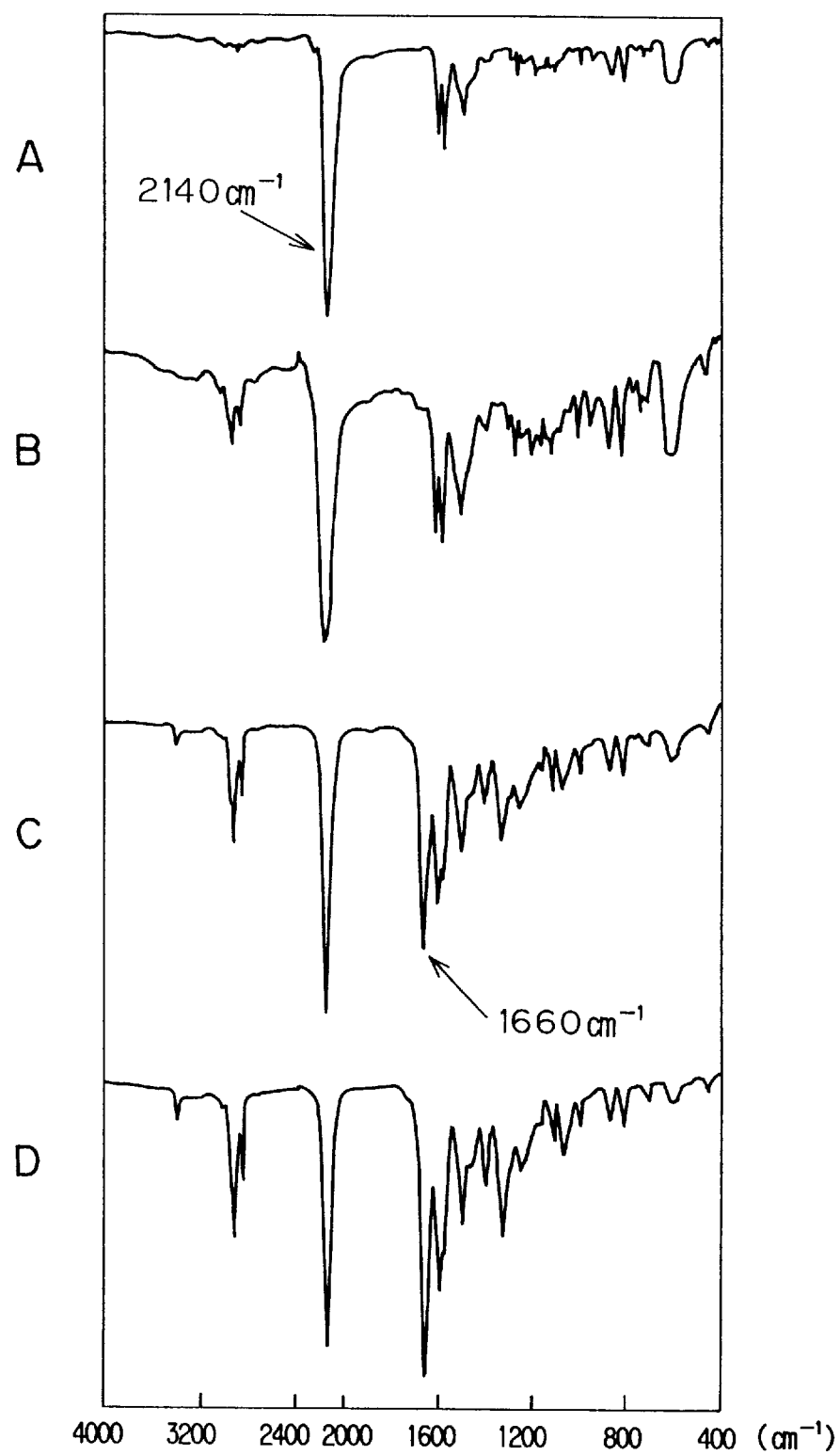
FIG. 4 shows IR spectra of a polycarbodiimide before and after effecting a reaction wherein the polycarbodiimide reacts, calculated with respect to the amount of carbodiimide linkage of the polycarbodiimide, with about 50 mole percent octanol in the presence of sodium methoxide as a catalyst.

The above solution was heated and maintained at 80° C. for one hour. Infrared absorption spectra before reaction and after maintaining at 80° C. are indicated in FIGS. 4A and 4B, respectively. Since no change is observed in IR spectra before and after reaction, it is clarified that no reaction occurs in the above-described condition.

The above solution was admixed with 10 mg of 28% sodium methoxide/methanol solution (0.83 mole percent based on carbodiimide linkage) as a catalyst, and stirred at 80° C. for one hour to obtain a polymer having both an isourea linkage and a carbodiimide linkage. Changes in IR spectra with time are indicated in FIGS. 4C and 4D, respectively. FIG. 4C shows the state immediately after the addition of the catalyst, while FIG. 4D shows the state 60 minutes after the addition of the catalyst. From FIGS. 4C and 4D, it is apparent that the absorption band at 1660 cm$^{-1}$ assignable to isourea linkage has emerged.

The resultant polymer gave the following $^{13}$CNMR.

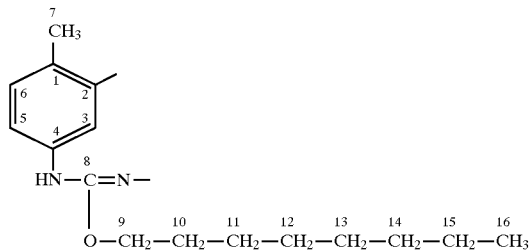

$^{13}$CNMR (75 MHz, CDCl$_3$): δ13.99(C-16), 17.03(broad, C-7), 22.66(C-15), 26.12(C-14), 28.76(C-13), 29.26(C-12), 31.84(C-11), 32.79(C-10), 119.71(C-6), 120.00(C-5), 128.47(C-1), 129.37(C-3), 130.71(broad, C-2 and C-4), 136.90, 137.40, 146.50, 149.13(broad, C-8).

Based on the calculated intensity ratio between C-16 and C-7 of $^{13}$CNMR, the proportion of isourea linkage was 53.2 mole percent, which was nearly equal to the proportion of the octanol added, thereby verifying a nearly quantitative reaction.

The above-described evidence indicates that the ratio of an isourea linkage to a carbodiimide linkage can be controlled easily and at will by merely regulating the amount of a hydroxy-bearing compound to be added.

Example 5
(Reaction between a polycarbodiimide and methanol catalyzed by sodium methoxide)

Ten ml of chlorobenzene comprising 1.28 g of polycarbodiimide (containing 6.2 mmol of carbodiimide linkage) which was obtained according to Synthesis Example 2 and was admixed with 0.24 g of methanol (7.4 mmol and 120 mole percent based on carbodiimide linkage).

Figure 5:
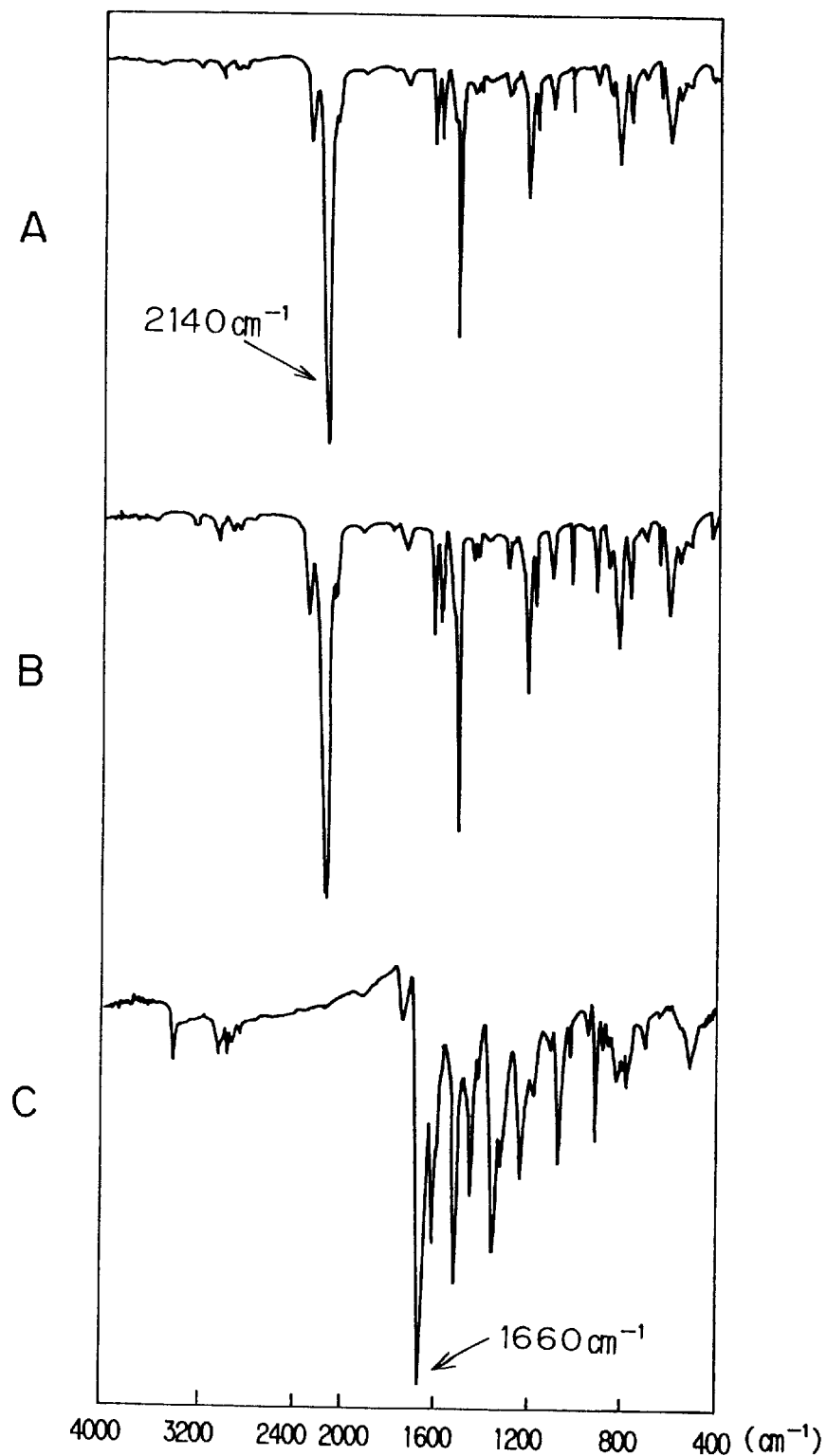
FIG. 5 shows IR spectra of a polycarbodiimide derived from methylenebis(4-phenylisocyanate) before and after effecting a reaction wherein the polycarbodiimide reacts, calculated with respect to the amount of carbodiimide linkage of the polycarbodiimide, with 120 mole percent methanol in the presence of sodium methoxide as a catalyst.

The above solution was heated and maintained at 80° C. for one hour. IR spectra before reaction and after maintaining at 80° C. are indicated in FIGS. 5A and 5B, respectively. Since no change is observed in IR spectra before and after reaction, it is clarified that no reaction occurs in the above-described condition.

The above solution was admixed with 10 mg of 28% sodium methoxide/methanol solution (0.83 mole percent based on carbodiimide linkage) as a catalyst, and stirred for 10 minutes at room temperature. FIG. 5C shows the state 10 minutes after the addition of the catalyst and indicates nearly perfect disappearance of the absorption at 2140 cm$^{-1}$ assignable to carbodiimide linkage and the emergence of the absorption band at 1660 cm$^{-1}$ assignable to isourea. As a result, it has been evidenced that the present invention is effective to the reaction between a polycarbodiimide and a hydroxy-bearing compound, because the reaction is found to have been brought to completion at room temperature and in a short period of time.

Example 6
(Reaction between a polycarbodiimide and triethylsilanol catalyzed by sodium methoxide)

Figure 6:
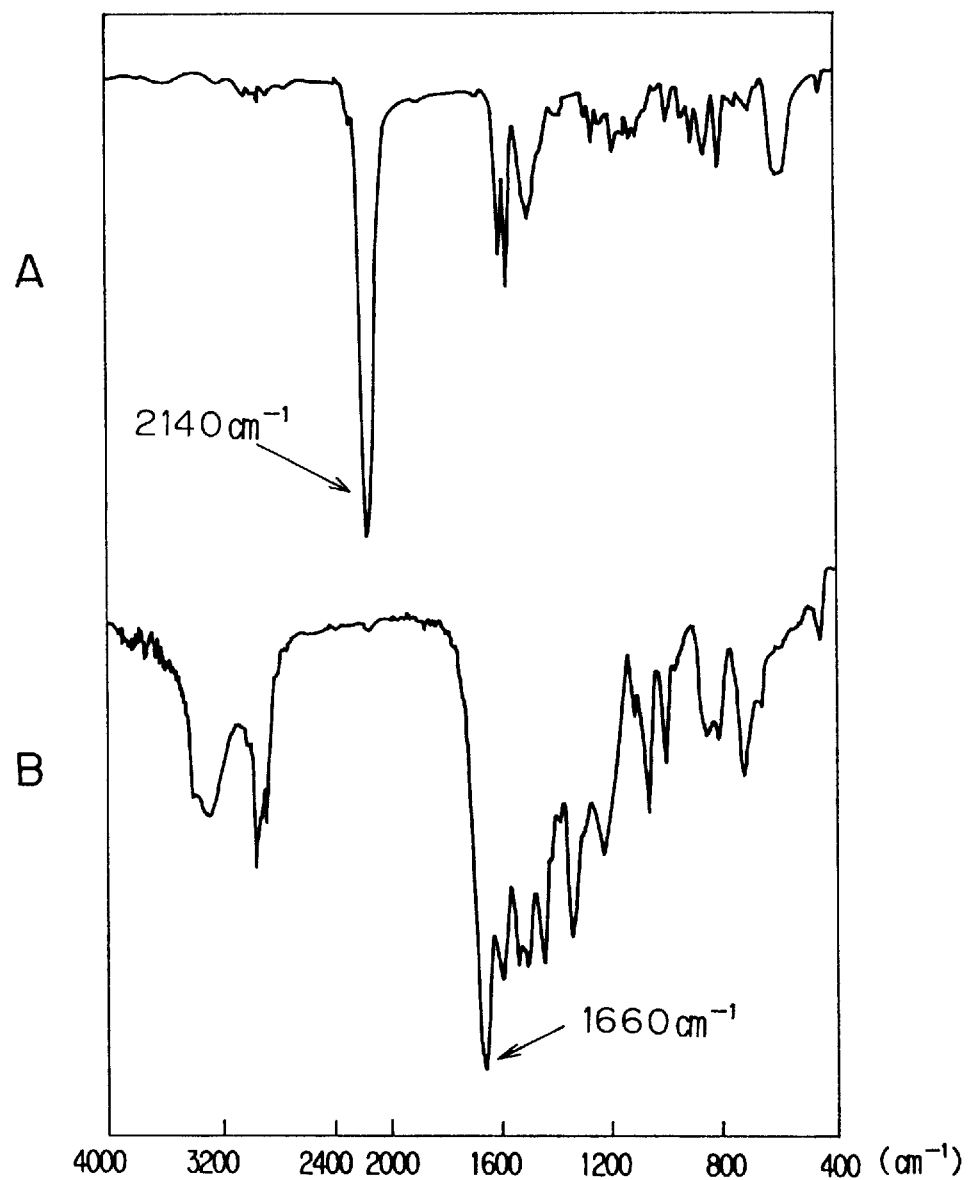
FIG. 6 shows IR spectra of a polycarbodiimide before and after effecting a reaction wherein the polycarbodiimide reacts, calculated with respect to the amount of carbodiimide linkage of the polycarbodiimide, with an equal molar amount of triethylsilanol in the presence of sodium methoxide as a catalyst.

Five ml of tetrachloroethylene comprising 0.41 g of polycarbodiimide (containing 3.1 mmol of carbodiimide linkage) which was obtained according to Synthesis Example 1 was admixed with 0.42 g of triethylsilanol (an equal molar amount based on carbodiimide linkage) and further with 50 mg of 28% sodium methoxide/methanol solution (8.5 mole percent based on carbodiimide linkage) as a catalyst, and the resultant solution was heated and maintained at 80° C. for 30 minutes. IR spectra before and after reaction are indicated in FIGS. 6A and 6B, respectively. After the reaction, the absorption at 2140 cm$^{-1}$ assignable to carbodiimide has almost disappeared and the absorption band at 1660 cm$^{-1}$ assignable to isourea linkage has emerged. As a result, it has been evidenced that the method according to the present invention is effective to the reaction between a polycarbodiimide and a silanol.

Example 7
(Reaction between a polycarbodiimide and 3-mercaptopropyltrimethoxysilane catalyzed by sodium methoxide)

Five ml of tetrachloroethylene comprising 0.41 g of polycarbodiimide (containing 3.1 mmol of carbodiimide linkage) which was obtained according to Synthesis Example 1 was admixed with 0.61 g of 3-mercaptopropyltrimethoxysilane (an equal molar amount based on carbodiimide linkage).

Figure 7:
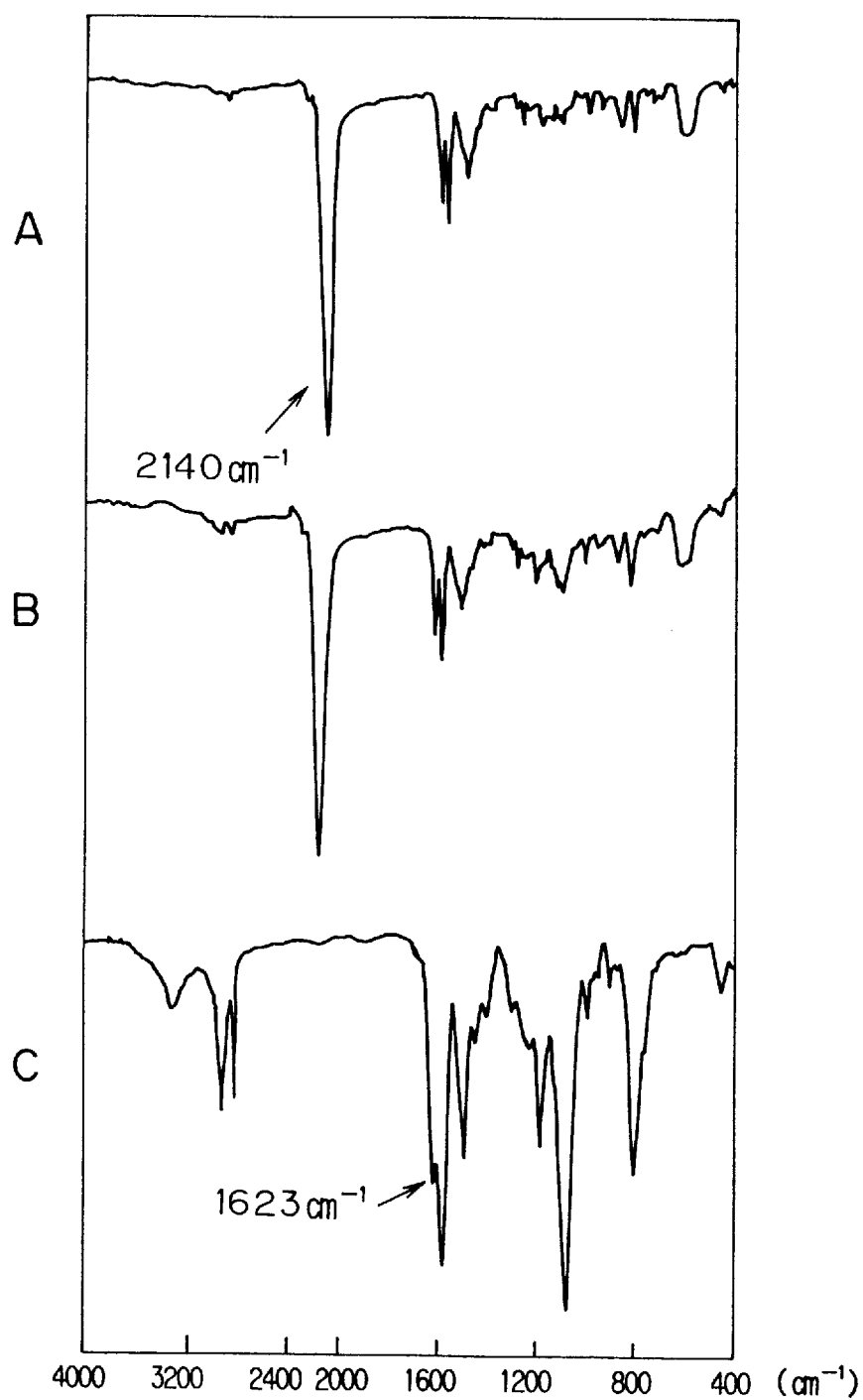
FIG. 7 shows IR spectra of a polycarbodiimide before and after effecting a reaction wherein the polycarbodiimide reacts, calculated with respect to the amount of carbodiimide linkage of the polycarbodiimide, with an equal molar amount. of 3-mercaptopropyltrimethoxysilane in the presence of sodium methoxide as a catalyst.

The above solution, which contained no catalyst, was heated and maintained at 80° C. for one hour. IR spectra before reaction and after maintaining at 80° C. are indicated in FIGS. 7A and 7B, respectively. Since no change is observed in IR spectra before and after reaction, it is clarified that no reaction occurs in the above-described condition.

The above solution was admixed with 10 mg of 28% sodium methoxide/methanol solution (1.7 mole percent based on carbodiimide linkage) as a catalyst, and stirred for one hour at room temperature. FIG. 7C shows IR spectrum the reaction at this stage, which indicates the disappearance of the absorption of at 2140 cm$^{-1}$ assignable to carbodiimide and the emergence of the absorption band at 1623 cm$^{-1}$ assignable to isothiourea as a result of the reaction. It has been evidenced that the present invention is effective to the reaction between a polycarbodiimide and a mercapto-bearing compound.

Example 8
(Crosslinking a polymer having isourea and carbodiimide linkages by a thermal treatment)

The polymer solution in tetrachloroethylene obtained according to Example 4 was cast onto a glass plate to make a layer, which was air-dried and then vacuum-dried to remove solvent. In this way, a film of a polymer having isourea and carbodiimide linkages was obtained. This film was thermally treated under vacuum at 200° C. for one hour to become a crosslinked film having a thickness of 33 μm.

The films thus obtained were subjected to the measurement of tensile strength. The film which had not been thermally treated exhibited a value of 41 kgf/cm$^2$, whereas the thermally treated film exhibited 2.30×10$^2$ kgf/cm$^2$. The film had its strength remarkably increased as a result of the thermal treatment, while retaining a fairly good flexibility.

Example 9
(Crosslinking a polymer having isourea and carbodiimide linkages by means of a basic substance)

The polymer solution in tetrachloroethylene obtained according to Example 4 was admixed with 1,8-diazabicyclo[5.4.0]undecene in an amount of 1 mole percent based on carbodiimide linkage, and the resultant mixture was cast onto a glass plate to make a layer, which was air-dried and then vacuum-dried and was further heated at 80° C. for one hour. In this way, a 25 μm-thick film of trimerization-crosslinked polymer having isourea and carbodiimide linkages was obtained.

The films were subjected to the measurement of tensile strength. The film which had not been treated exhibited a value of 41 kgf/cm$^2$, whereas the film, which had been crosslinked by the addition of a basic substance, exhibited 3.8×10$^2$ kgf/cm$^2$. The film had its strength remarkably increased as a result of crosslinking treatment, while retaining a fairly good flexibility.

What is claimed is:

1. A polymer of formula (1) or (2) which has an isourea linkage or isothiourea linkage and which is prepared by reacting an organic compound containing one hydroxy or mercapto group with a polycarbodiimide compound in the presence of an alcoholate of an alkali metal or of an alkaline earth metal:

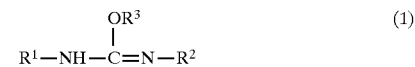

-continued $$R^4-NH-\underset{|}{\overset{SR^6}{C}}=N-R^5 \qquad (2)$$

wherein $R^1$, $R^2$, $R^3$, $R^4$, $R^5$ and $R^6$ represent an organic group having a carbon and/or silicon atom.

2. A method for preparing a polymer having an isourea linkage or isothiourea linkage, comprising the step of reacting an organic compound containing one hydroxy or mercapto group with a polycarbodiimide compound in the presence of an alcoholate of an alkali metal or of an alkaline earth metal.

3. A polymer having an isourea linkage or isothiourea linkage and a carbodiimide linkage, obtained by reacting an organic compound containing one hydroxy or mercapto group with a polycarbodiimide compound in the presence of an alcoholate of an alkaline earth metal.

4. A method for preparing a polymer having an isourea linkage or isothiourea linkage and a carbodiimide linkage, comprising the step of reacting an organic compound containing one hydroxy or mercapto group with a polycarbodiimide compound in the presence of an alcoholate of an alkali metal or of an alkaline earth metal.

5. A crosslinked polymer obtained by crosslinking the carbodiimide linkage of the polymer having an isourea linkage or isothiourea linkage and a carbodiimide linkage obtained by reacting an organic compound containing one hydroxy or mercapto group with a polycarbodiimide compound in the presence of an alcoholate of an alkali metal or of an alkaline earth metal.

6. A method for preparing a crosslinked polymer comprising the step of crosslinking the carbodiimide linkage of the polymer having an isourea linkage or isothiourea linkage and a carbodiimide linkage obtained by an organic compound containing one hydroxy or mercapto group with a polycarbodiimide compound in the presence of an alcoholate of an alkali metal or of an alkaline earth metal.

7. The crosslinked polymer according to claim 5 wherein the crosslinking of the carbodiimide linkage is effected by heating.

8. The method for preparing a crosslinked polymer according to claim 6, comprising the step of heating for the crosslinking of the carbodiimide linkage.

9. The crosslinked polymer according to claim 5 wherein the crosslinking of the carbodiimide linkage is effected by adding a base which promotes a trimerization reaction of the carbodiimide linkage.

10. The method for preparing a crosslinked polymer according to claim 6, comprising the step of adding a base which promotes a trimerization reaction of the carbodiimide linkage to effect the crosslinking of the carbodiimide linkage.

* * * * *

UNITED STATES PATENT AND TRADEMARK OFFICE
CERTIFICATE OF CORRECTION

PATENT NO. : 5,821,325
DATED : October 13, 1998
INVENTOR(S) : Ken YAHATA, et al

It is certified that error appears in the above-identified patent and that said Letters Patent is hereby corrected as shown below:

On the title page, item:

[73]    Assignee:    Shin-Etsu Chemical Co., Ltd., Tokyo Japan

Signed and Sealed this

Twenty-third Day of February, 1999

Attest:

Q. TODD DICKINSON

*Attesting Officer*            *Acting Commissioner of Patents and Trademarks*